United States Patent [19]

Moberly

[11] Patent Number: 4,850,617
[45] Date of Patent: Jul. 25, 1989

[54] SELF SEALING CONNECTOR

[76] Inventor: Dan LeRoy Moberly, NW. 145 Robert, Pullman, Wash. 99163

[21] Appl. No.: 132,979

[22] Filed: Dec. 15, 1987

[51] Int. Cl.$^4$ ............................................. F16L 41/00
[52] U.S. Cl. ..................................... 285/42; 285/159; 285/162; 4/288
[58] Field of Search ............... 285/159, 158, 162, 196, 285/338, 346, 42, 56, 57, 58, 59, 60; 4/288, 252 R

[56] References Cited

U.S. PATENT DOCUMENTS

| 569,247 | 10/1896 | Smith | 285/59 |
|---|---|---|---|
| 1,253,406 | 1/1918 | McNeil . | |
| 2,316,724 | 4/1943 | Sperry . | |
| 3,668,718 | 6/1972 | Cuschera | 4/288 |
| 3,700,381 | 10/1972 | Deeke | 4/288 |
| 3,879,065 | 4/1975 | Kobayashi | 285/162 X |
| 3,896,511 | 7/1975 | Cuschera . | |
| 3,952,340 | 4/1976 | Cuschera | 4/288 X |
| 4,090,267 | 5/1978 | Cuschera | 4/288 |
| 4,161,043 | 7/1979 | Flores | 285/59 X |
| 4,207,632 | 6/1980 | Savell, Jr. et al. . | |
| 4,505,499 | 3/1985 | Uglow et al. | 285/338 X |
| 4,574,402 | 3/1986 | Brown, Sr. | 285/56 X |

FOREIGN PATENT DOCUMENTS 1247478  9/1971  United Kingdom ................. 285/56

Primary Examiner—Thomas F. Callaghan
Attorney, Agent, or Firm—Wells, St. John & Roberts

[57] ABSTRACT

A connector is described for connecting a pipe to a plate through an opening in the plate. The connector includes a resilient gasket sleeve with an internal bore wall that is slidably receivable over the pipe, and an external wall that is receivable through the plate opening. A rim and a retainer wall member are provided on opposite ends of the gasket sleeve, interconnected by a number of threaded fasteners. The entire unit can be inserted through the plate opening from the top side thereof so the gasket sleeve is received over the pipe and the rim abuts the top surface of the plate. The fasteners can then be tightened drawing cam surfaces on the rim and retainer together axially to deform the gasket sleeve. In doing so, the internal wall of the sleeve is expanded inwardly to securely seal and grip the pipe while the external wall is expanded outwardly to securely grip and seal against the plate.

20 Claims, 3 Drawing Sheets

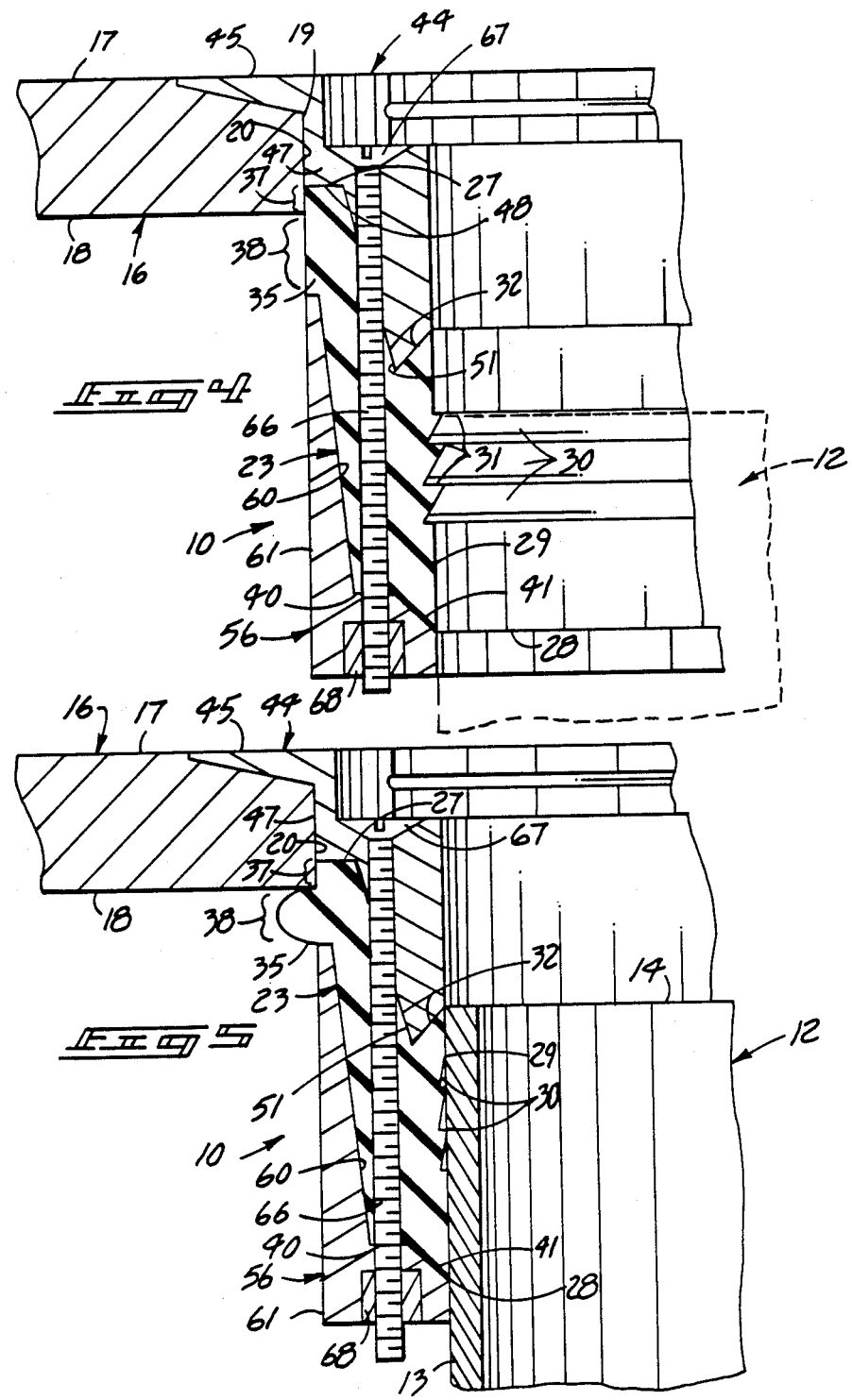

SELF SEALING CONNECTOR

TECHNICAL FIELD

The present invention relates to a connector for joining and sealing an end of a pipe to a plate through an opening in the plate and more particularly to such a connector that may be fitted and sealably secured from one side of the plate.

BACKGROUND OF THE INVENTION

Self-sealing connectors are known for interconnecting one end of a pipe to a plate. For example, a plate such as the floor of a conventional shower base or bathtub requires a fitting at the drain opening for interconnecting the shower or tub to a drain pipe. Difficulty is experienced in positioning the shower base or tub in relation to the relatively stationary drain pipe. The axis of the drain opening may not be easily aligned perfectly with the axis of the drain pipe.

Another problem experienced in presently known connectors is that they require pre-assembly. Portions of the connector must be attached to one side of the plate while other pieces need be assembled from the opposite side. Once this assembly is made, the entire assembled unit including the plate and connector is placed over the drain pipe in an attempt to align the drain fitting with the drain pipe by physically moving the shower, tub, etc. about. This can be a very frustrating and strenuous experience. A need has therefore arisen for some form of connector that may be fitted between a opening within a plate such as the floor plate of a shower or tub and a pipe, such as a drain pipe in which the connector fitting may be attached through from an upper surface of the plate after the plate has been positioned over the pipe.

U.S. Pat. No. 4,207,632 to Savell, et al. discloses a drain means in partial recognition of the above alignment problems between a plate (such as a shower floor) and a drain pipe. This device includes a two piece construction, one element requiring pre-assembly by attachment to the bottom surface of the shower floor and a second element that fits within a conical shaped opening of the first element. The two loosely fitting elements allow for misalignment between the shower drain opening and the drain pipe axis but requires the use of glue or adhesive to secure the second element to the pipe and to the first element. Special care must be taken to avoid leaks in the glue joints. Disassembly is also made difficult by the usually permanent nature of the glue.

U.S. Pat. No. 3,896,511 and U.S. Pat. No. 3,668,718 to Cuschera discloses a self-caulking drain. This device also requires sub-assembly of the connector to the shower or tub floor prior to installation over the drain pipe. The Cuschera device includes the advantage of a gasket that may be mechanically deformed by a snap ring to provide an effective seal between the connector and the external wall of the pipe.

U.S. Pat. No. 2,316,724 to Sperry discloses an all rubber outlet pipe connector for tanks. The rubber connector is slotted to receive an angularly oriented flange of the tank. It also includes an opening for receiving the pipe and an O-ring or other gripping device for securing the device to the pipe. The nature of the downwardly oriented tank flange requires subassembly of the connector to either the tank or the pipe prior to final assembly. In either manner, the entire tank must be moved or the pipe must be selectively moved to complete the connection.

U.S. Pat. No. 1,253,406 to McNeil discloses a drain coupling for porcelain troughs. This coupling requires use of a special adapter at the drain pipe end to facilitate connection of a drain grid. The trough is secured to the pipe through a lead or litharge gasket. Screws are provided for clamping a drain grate to the specially formed drain pipe end.

Of the above references, none facilitate connection between a pipe and a plate from one side of the plate and in a manner by which the plate and pipe can be aligned selectively prior to installation of the connector member without requiring that at least portions of the connector member be previously attached to the plate member or pipe.

BRIEF DESCRIPTION OF THE DRAWINGS

A preferred form of the present invention is exemplified by the accompanying drawings, in which:

FIG. 4 is an enlarged, fragmented section of the present connector without drain grate showing the interfitting relationship of the connector with a plate and a pipe shown by dashed lines; and FIG. 5 is a view similar to FIG. 4 showing the connector components in position, clamping and sealing the plate to the pipe.

DETAILED DESCRIPTION OF THE PREFERRED EMBODIMENT

Figures 1, 2:
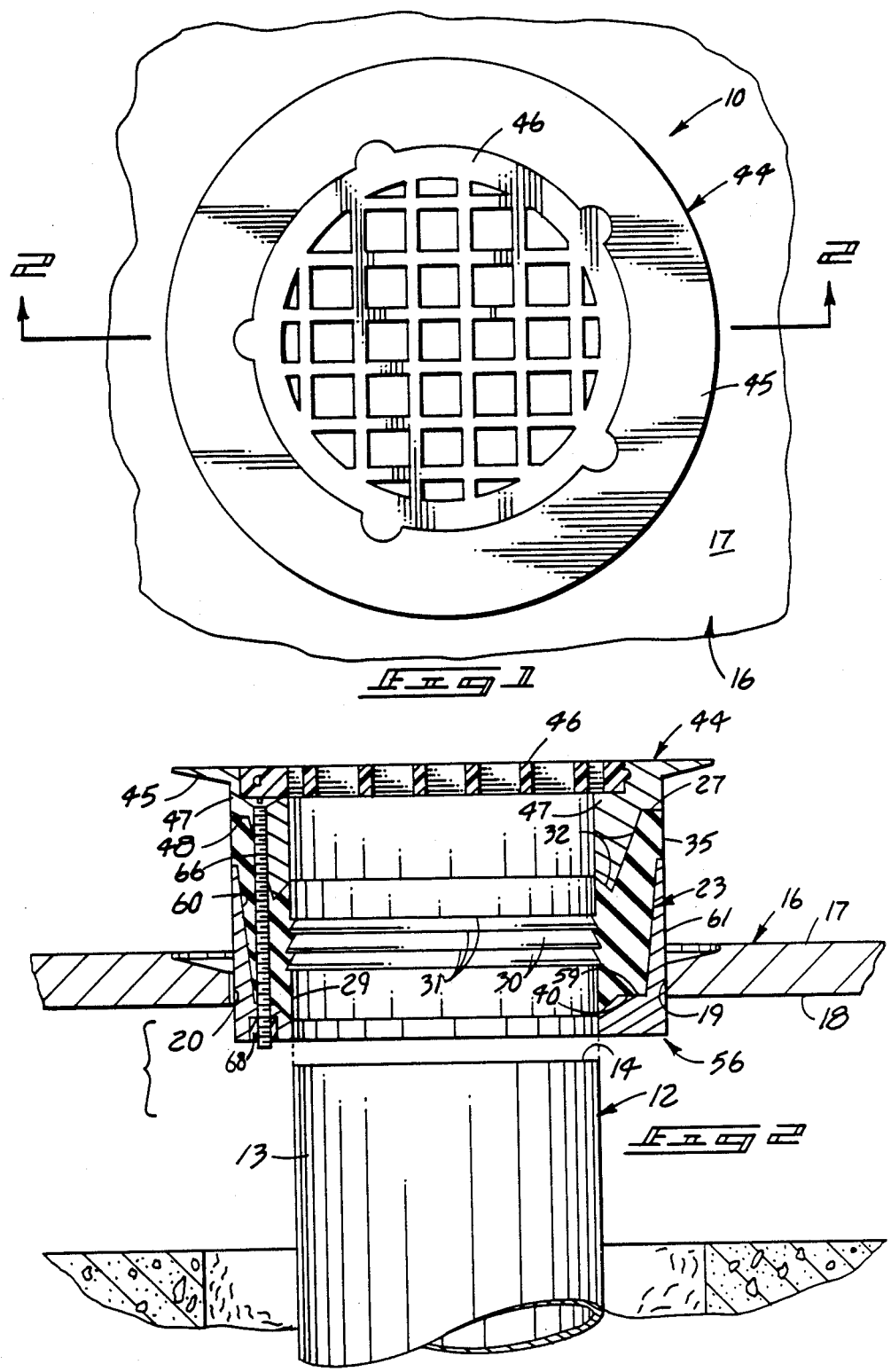
FIG. 1 is a top plan view of the present connector with a drain grid installed.
FIG. 2 is a sectional view taken through the connector along line 2—2 in FIG. 1 and showing the connector in a pre-assembly orientation with a plate and pipe.

The following disclosure of the invention is submitted in compliance with the constitutional purpose of the Patent Laws "to promote the progress of science and useful arts" (Article 1, Section 8).

The present connector is identified in the accompanying drawings by the reference numeral 10. It is shown in exemplary form for providing a secure, sealed fit between a pipe 12 and a plate 16.

The plate 16 may be simply a flat plate which may be an integral part of another object, such as a shower drain base, bathtub floor, tank wall, etc. The plate 16, for purposes of reference, will include a top 17 and an opposed bottom surface 18. The plate will include a substantially circular connector receiving opening 19 that is defined by a closed wall 20 formed about a plate receiving opening axis.

The pipe and plate 12 may be of any form basically of pipe, including drain pipes, fluid flow pipes, etc. The pipe 12 will include a substantially cylindrical outer surface 13 extending to an end 14 that is spaced from the plate bottom surface 18.

In general terms, the present connector 10 includes a resilient gasket sleeve 23 that is receivable over the pipe 12 and through the connector receiving opening 19. It includes appropriate surfaces for gripping both the pipe and the plate in the vicinity of the opening 19. To this end, means is provided as exemplified below, for radially deforming the resilient gasket sleeve in such a manner that inward surfaces of the gasket will compress and seal against the pipe and external surfaces of the gasket will expand outwardly to seal against the plate about the opening 19.

It is generally advantageous that the means for radially deforming the sleeve be provided in the form of one or more annular cams provided at one or both of an annular rim member 44 and an annular retainer member 56 situated at opposite ends of the resilient gasket sleeve 23.

An exemplary operator means is also described in detail below to axially press the cam or cams and gasket sleeve 23 together in order to deform the gasket sleeve so it will securely grip the pipe and plate and form a seal between the two.

As will be understood below, the entire connector assembly may be fitted through the connector receiving opening 19 and the operator means 65 may be actuated from above the plate top surface in order to secure and seal the connector member in place.

More specific details of an exemplary construction of the resilient gasket sleeve 23 may be best understood with reference to FIGS. 2-5. The resilient gasket sleeve 23 is preferably an annular article preferably formed of a rubber material having a durometer of approximately 65. Rubber is the preferred material due to its inherent resiliency and its capability to maintain its resilient character without acquiring a "set" after a long period of compression. Rubber is also preferred due to its capacity to deform and establish a water-tight seal. The durometer value (65) has been established to meet requirements of sufficient rigidity to maintain a self supporting state in the form illustrated and to tolerate sufficient deformation such that the sleeve may flex to compensate for slight misalignment between the axis of the plate connector receiving opening 19 and the axis of the pipe 12.

The rubber material forming the resilient gasket sleeve may be formed by molding or other conventional forming processes.

The gasket sleeve 23 will include a top end 27 and an axially spaced bottom end 28. An internal surface 29 is formed about a central axis within the sleeve. The surface 29 defines a bore that extends axially through the sleeve to slidably receive the outer surface 13 of the pipe.

The internal surface 29 of the gasket sleeve may be provided with a number of annular serrations 30. The serrations 30 are angularly disposed, as shown in FIG. 4 with ridges 31 pointing angularly upward. The internal diameter of the bore at the ridges 31 is slightly less than the external diameter of the pipe surface 13. Ridges 31 will therefore rub and deflect against the pipe surface 13 as the connector is pressed over the pipe. The serrations will bend upwardly as the connector is pushed downwardly over the pipe end and the ridges 31 will form resiliently about the pipe and seal about the pipe circumference.

Cam engaging surfaces 32 are also formed in the gasket sleeve 23 adjacent its top end 27. The surfaces 32 are shaped to be complementary to cam surfaces that will be described below in conjunction with the annular rim member 44.

The resilient gasket sleeve 23 also includes an external surface 35. The external surface 35 is normally substantially cylindrical in configuration, formed about the central axis of the sleeve. Surface 35 may include a diameter dimension that is slightly less than that of the connector receiving opening so the gasket sleeve can be freely, axially received through the opening 19.

The external surface 35 may be considered a plate gripping surface which, when expanded, securely engages and seals against adjacent surfaces of the plate 16 to secure the connector relative to the plate. To this end, the external surface 35 may include a first axial section 37 (FIGS. 4, 5). Section 37 extends downwardly from the top sleeve end 27 to overlap an axial extent of the connector receiving opening wall 20.

A second axial section 38 extends on downwardly from the first section 37. Second axial section 38 is provided to project downwardly below the bottom surface 18 of the plate. Section 38 will deform radially outward when the resilient gasket sleeve is compressed in order to grasp and seal against the bottom plate surface 18 as shown in FIG. 5.

A retainer ring receiving surface 39 is situated axially below the second axial section 38. It is substantially frusto-conical shaped, converging downwardly to a substantially flat section 40. A wedge abutment surface 41 then extends on downwardly from the flat section 40 to the bottom gasket sleeve end 28. Surfaces 39, 40, and 41 are shaped to be received in flush abutment with surfaces of the annular retainer member 56.

A number of axial bores 42 (FIG. 3) may be provided through the resilient gasket sleeve. Five of the bores 42 are shown. Each is spaced radially, with respect to the axis for the resilient sleeve, between the internal surface 29 and external surface 35. The bores 42 are preferably parallel to the sleeve axis and to one another, and are equiangularly spaced about the sleeve.

The annular rim member 44 is preferably formed of a substantially rigid material such as appropriate forms of plastic or a noncorrosive metal such as brass that is conventionally utilized for connections and fittings. Rim member 44 includes a radial flange 45 that is substantially circular and of a diameter greater than the diameter of the connector receiving opening 19. The flange 45 will therefore rest against the top plate surface 17 or within a countersink configuration adjacent the top surface to prevent the connector 10 from being pulled downwardly through the plate. The flange 45 may include a central recess shaped to releasably receiving a grate 46 (FIGS. 1, 2). Grate 46 may be supplied if the connector is to be utilized as, for example, a shower drain fitting. The grate is not shown in FIGS. 3-5.

The annular rim member 44 includes a downwardly projecting sleeve section 47. The sleeve section 47 is also substantially circular and is shaped to be slidably received within the container receiving opening adjacent the wall 20. An annular gasket abutment surface 48 is formed along the sleeve section 47. It is preferably axially spaced from the top surface of the flange by a distance less than the thickness of plate 16. The abutment surface 48, when installed, is therefore situated substantially as shown in FIGS. 4 and 5, to facilitate positioning of the first axial section 37 of the gasket sleeve, overlapping the wall surface 20.

A number of axial holes 49 are formed through the annular rim member 44. The holes 49 are situated within the recess formed to receive the grate 46. The holes 49 are spaced about the rim to align with the holes or axial bores 42 formed through the gasket sleeve 23.

The annular rim member 44 also includes a wedge cam surface 51. This surface is formed as a frusto-conical section of the rim, facing outwardly and converging downwardly from the annular gasket abutment surface 48. An inwardly facing cam surface 53 converges upwardly from the bottom end of the rim member.

Figure 3:
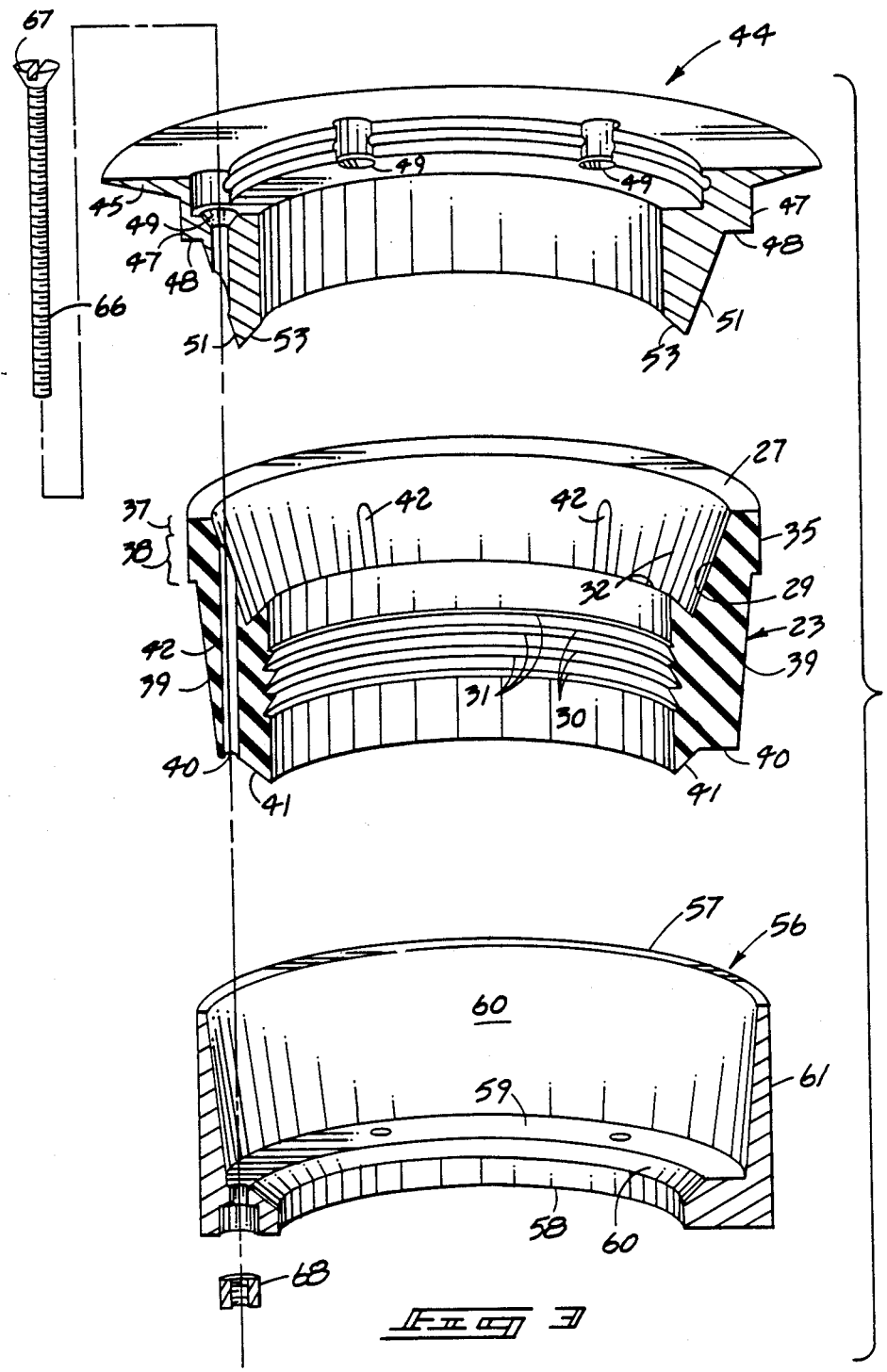
FIG. 3 is a sectioned, exploded pictorial view of the present connector without the drain grate.

The annular retainer member 56 extends axially between its top end 57 and a bottom end 58 (FIG. 3). Retainer member 57 also includes a radial surface 59 adjacent its bottom end for abutting the flat surface 40 adjacent the bottom end 28 of the resilient gasket sleeve 23. An inwardly facing inclined wall surface 60 extends upward and downwardly from the surface 59 to axially overlap sections of the gasket sleeve and the outward frusto-conical cam section 51 of the rim member. Wall surface 60 serves to contain the resilient gasket material radially and to prevent the resilient gasket sleeve from buckling axially on compression. It also functions as a cam surface to urge the inward surfaces of the gasket sleeve inwardly to clamp and seal against the pipe 12.

The annular retainer member 56 is preferably formed of a rigid material such as brass, or could conceivably be formed of an appropriate injection molded plastic.

The annular retainer member 56 also includes an outwardly facing surface 61. The surface 61 is preferably cylindrical and of a diameter substantially equal to that of the plate gripping surfaces 35 of the resilient gasket sleeve 23. The outward surface diameter is therefore less than the diameter of the connector receiving opening to facilitate slidable reception of the connector member from the top of the plate through the connector member receiving opening 19.

The cam means exemplified herein is included between both of the retainer member 56 or annular rim member 44. The cam means includes cam surfaces 51, 53 on the rim member 44 and surfaces 60 of the retainer 56 that engage complimentary surfaces of the gasket sleeve 23, for the purpose of producing radial deflection of the resilient sleeve. It is noted that cam surfaces 51, 53 and 60 shown and described herein are included on both the rim member 44 and the retainer 56. However, it is conceivable that the present connector may be produced with a single cam surface or surfaces on either the rim member 44 alone, the retaining member 56 alone, or separately therefrom for purposes in causing radial deflection of the resilient sleeve when the cam is pressed axially against the sleeve.

An operator means 66 is provided for pressing the cam surfaces and the gasket axially together such that the engaged cam surfaces deform the gasket sleeve. In so doing, the cam surfaces 60, 53 will cause the internal surface of the gasket sleeve to reduce in diameter and cam surface 51 will cause the external surface to radially expand. The internal gasket surface will therefore grip the pipe and the external surface will expand against and grip the plate.

The operator means may include a number of headed fasteners 66 that extend axially through the aligned bores 42 and 49. The fasteners include heads 67 for abutment with the annular rim member 56 and threaded shanks that extend downwardly through the aligned bores to threadably engage nuts 68 that are mounted to or integral with the annular retainer member 56.

The headed ends of the fasteners may be accessed from the top side of the plate. They may be turned to selectively draw the nuts 68 and consequently, the retainer member and resilient sleeve 23 axially toward the bottom surface of the plate. This causes compression of the sleeve and its deformation against the pipe and the plate so both are gripped by the deformed sleeve. This condition is illustrated in FIG. 5.

The operator means including fasteners 66 and 68 are preferably formed of a non-corrosive material such as brass.

From the above description, operation of the invention may now be easily understood.

Preparation for installation of the present connector is accomplished simply by roughly positioning the plate 16 over the pipe 12. This is done with a visual attempt to align the center of the opening with the axis of the pipe. However, slight misalignment may be permissible due to the resilient nature of the resilient gasket sleeve 23.

With the plate and pipe in substantial alignment, the installer simply inserts the present connector through the plate opening from the top side thereof. It is important to note that none of the connector assembly has required previous mounting to the plate or the pipe. The entire connector is inserted through from the top side of the plate. This is done in a simple and quick manner due to the relatively smaller diameter size of the connector in relation to the opening. The retainer member 56 will slide easily through the opening, as will the outward exposed surfaces of the sleeve.

The connector is inserted fully through the opening until the flange 45 comes into abutment with the surfaces of the plate about the opening 19. Just prior to seating of the flange 45, the pipe 12 is encountered and is slidably received within the flange. Resiliency of the flange at this point will compensate for slight misalignment between the plate opening and the pipe. In other words, the pipe will be slidably received within the resilient sleeve but may cause slight deflection of the sleeve in doing so. The loose fit between the internal surface 29 of the resilient sleeve and the pipe surface enables this misalignment, as well as the flexible nature of the gasket material and that of the annular serrations 30.

It is preferable that the pipe be of sufficient length to be received to the approximate axial position shown in FIG. 5. Of course it is also preferred that the flange be seated firmly against the plate before the connector is tightened into position.

Once the proper position is achieved which takes a matter of seconds, the installer may secure the connector by turning the threaded fasteners 66. If the fasteners are provided in the form of screws, a simple screwdriver can be utilized for this function. The installer preferably tightens screws in a succession starting with one screw tightened partway then shifting to a screw substantially diametrically opposite the tightened screw. This procedure will continue until all the screws are appropriately tightened. The screws function to draw the retainer member 56 upwardly. The cam surfaces of the rim and retainer members cooperate in this regard to simultaneously force the inward surfaces of the resilient gasket sleeve inwardly to securely clamp and seal the surface against the pipe while also expanding the outward exposed surfaces of the sleeve against the plate.

In the example shown, the first axial section 37 of the gasket sleeve 23 is pressed radially against and seals the plate opening wall 20. The second axial section 38 is not confined by the wall 20 or retainer 56 and is therefore allowed to expand to a bead configuration about the opening, sealing against the bottom plate surface 18. The single resilient gasket sleeve therefore functions to securely mount the connector to both the plate and to the pipe. The sleeve, rim and retainer also serve to firmly pull the flange 45 downwardly against the plate during installation.

Installation is completed as the last screw is tightened, such that the resilient sleeve has sealed against the plate opening about its entire circumference and has effectively sealed and clamped against the pipe.

The drain grate 46, if used, may now be fitted as shown in FIG. 1 to complete the installation procedure.

It is important to note that the entire procedure has taken place without requiring any prior mounting of the connector or parts thereof to the bottom surface of the plate and that the entire procedure is performed from the top surface of the plate therefore simplifying and speeding the connection procedure while providing a secure, removable seal.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A connector for sealably connecting a pipe and a base plate, the pipe having an external diameter and an end situated adjacent a bottom surface of the base plate and wherein the base plate includes a connector receiving opening defined by a closed wall adjacent to the pipe end, the connector comprising:
    an annular rim having a first gasket sleeve engaging surface thereon:
    a resilient gasket sleeve including a bottom end, and a top end engaging the annular rim, and further including an internal surface extending about an axis to define an open axial bore adapted to slidably receive the pipe:
    an annular retainer member having a second annular gasket sleeve engaging surface thereon engaging the gasket sleeve at the bottom end thereof;
    an external axial surface on the gasket sleeve extending about the axis of a size less than and complementary to the connector receiving opening such that the gasket sleeve is loosely receivable axially through the connector receiving opening in the plate;
    a plate gripping surface on the resilient gasket sleeve including a first axial section downwardly adjacent the top sleeve end to axially overlap a portion of the wall of the connector receiving opening;
    a second axial section downwardly adjacent the first axial section to project axially downward of the bottom plate surface;
    the first axial section being expandable radially outward to seal against the portion of the wall of the connector receiving opening and the second section being expandable against the bottom surface of the plate; and
    means for drawing the annular rim and annular retainer together to radially deform the resilient gasket sleeve such that the internal surface of the resilient gasket sleeve compresses and seals against the pipe and the first and second axial sections of the plate gripping surface expand and seal against the plate about the connector receiving opening thereof.

2. The connector of claim 1 wherein the means for radially deforming the resilient gasket sleeve comprises operator means selectively operable from a side of the plate opposite the bottom surface thereof, for axially compressing the resilient gasket sleeve.

3. The connector of claim 1 further comprising annular serrations formed in the resilient gasket sleeve along the internal surface thereof with each serration having an inward annular ridge on a diameter through the axis less than the external diameter of the pipe.

4. The connector of claim 1 wherein the means for radially deforming the resilient gasket sleeve is comprised of:
    an annular cam means having at least one cam surface for engaging the gasket sleeve end surfaces; and
    operator means for pressing the cam surface and the gasket sleeve axially together such that the cam surface deforms the gasket sleeve with the internal gasket sleeve surface reducing in diameter and the external surface radially expanding.

5. The connector of claim 4
    wherein the cam means is located on at least one of the gasket sleeve engaging surfaces.

6. The connector of claim 5 wherein the annular rim and the annular retainer member each include a cam surface thereon and wherein the cam surfaces face one another and abut the gasket sleeve.

7. The connector of claim 6 wherein the resilient gasket sleeve includes annular cam engaging surfaces that are complementary to and axially abut the respective cam surfaces of the annular retainer member and the annular rim.

8. The connector of claim 5 wherein the resilient gasket sleeve includes at least two bores formed axially therethrough and are located radially between the internal and external surfaces thereof and situated substantially diametrically opposite one another with respect to the axis;
    wherein the annular rim member includes openings aligned with the gasket sleeve bores; and
    wherein the operator means is comprised of threaded fasteners each having a headed end and a threaded shank, the shank extending axially through the gasket sleeve and at least partially through the openings in the cam member with the headed ends operably engaging the annular rim member; and
    nut means, on the annular retainer member, threadably engaging the threaded shanks of the threaded fasteners such that selective rotation of the threaded fasteners relative to the nut means will cause relative opposite axial motion of the annular rim and the annular retainer members.

9. The connector of claim 1 wherein the resilient gasket is formed of rubber having a durometer of approximately 65.

10. The connector of claim 1 wherein the annular rim member includes a radially projecting flange for overlapping a top surface of the base plate and an axial sleeve section extending from the flange to a shoulder abutting the resilient gasket sleeve and axially positioned in relation to the flange to be received within the connector receiving opening along the closed wall thereof and the plate gripping surface of the resilient gasket sleeve axially overlapping a portion of the closed wall.

11. The connector of claim 10 wherein the means for radially deforming the resilient gasket sleeve includes a cam means on one of the rim or retainer members abutting the gasket sleeve for radially deforming the resilient gasket sleeve against the portion of the closed wall of the plate and against a surface of the plate opposite the one side thereof.

12. A connector for sealably connecting a pipe and a plate, the pipe having a prescribed external diameter along a pipe axis and an end spaced axially downward of a bottom surface of the plate facing the pipe, the plate including a top surface facing away from the pipe and a connector receiving opening defined by a circular wall formed about a connector opening axis at a prescribed internal diameter, the connector comprising:

an annular rim formed about an axis and having a substantially radial flange at an upper end thereof with an external diameter greater than the connector receiving opening;

a rigid sleeve section on the annular rim projecting axially from the flange of the annular rim to be received axially within the connector receiving opening from the top surface thereof;

an annular gasket abutment surface on the annular rim spaced axially from the flange;

a resilient gasket sleeve including a top end, a bottom end, a bore defined by an internal wall having a pipe gripping surface axially downward of the sleeve section and shaped to be received axially through the connector receiving opening and over the external diameter of the pipe;

the resilient gasket sleeve also having an external substantially cylindrical plate gripping surface axially overlapping the sleeve section and radially inward thereof to be slidably received through the connector receiving opening from the top side thereof; and a rigid retainer member received over the gasket sleeve, axially overlapping the pipe gripping surface and radially outward thereof;

operator means connecting the annular rim and the retainer member for selectively drawing the gasket sleeve toward the annular rim;

means for radially deforming the resilient gasket sleeve responsive to the operator means such that the pipe gripping surface is compressed about the pipe coaxially therewith and such that the plate gripping surface is expanded and sealed against the plate in a substantially coaxial relationship with the connector receiving opening axis.

13. The connector of claim 12 wherein the axial dimension of the annular rim from the flange to the annular gasket abutment surface is less than the axial dimension of the plate between the top and the bottom surfaces thereof;

the plate gripping surface of the resilient gasket sleeve including a first axial section downwardly adjacent the top sleeve end to axially overlap a portion of the circular wall of the connector receiving opening; and the plate gripping surface further including a second axial section downwardly adjacent the first axial section to project axially downward of the bottom plate surface;

the first axial section being expandable radially outward to seal against the portion of the circular wall of the connector receiving opening and the second section being expandable against the bottom surface of the plate.

14. The connector of claim 12 further comprising a substantially rigid annular retaining wall means having a substantially radial surface thereon axially abutting the resilient gasket sleeve and a retaining wall, axially overlapping the gasket sleeve upwardly of the sleeve bottom end to prevent the gasket sleeve from crimping axially.

15. The connector of claim 14 wherein the annular retaining wall extends axially upward from the sleeve bottom end, encircling and axially overlapping the resilient gasket sleeve from the bottom end thereof to the plate gripping surface.

16. The connector of claim 15 further comprising an outward facing cam surface on the sleeve section of the annular rim spaced radially inward of and axially overlapping the inwardly facing retaining wall of the retaining wall means;

wherein the outward facing cam surface engages the resilient gasket sleeve for urging the plate gripping surface of the resilient gasket sleeve outwardly responsive to the operator means.

17. The connector of claim 16 further comprising an inward facing frusto-conical cam surface on the annular rim member, engaging the resilient gasket sleeve for urging the pipe gripping surface of the gasket sleeve inwardly in response to the operator means.

18. The connector of claim 12 further comprising outward facing frusto-conical cam surface on the annular rim member engaging the resilient gasket sleeve for urging the plate gripping surface of the gasket sleeve outwardly in response to the operator means.

19. The connector of claim 12 further comprising an inward facing frusto-conical cam surface on the annular rim member engaging the resilient gasket sleeve for urging the pipe gripping surface of the gasket sleeve inwardly in response to the operator means.

20. A connector for sealably connecting a pipe and a plate, the pipe having a prescribed external diameter along a pipe axis and an end situated adjacent a bottom surface of the plate facing the pipe, the plate including a top surface facing away from the pipe and a connector receiving opening defined by a wall formed about a connector opening axis, the connector comprising:

an annular rim formed about an axis and having a substantially radial flange at an upper end thereof with a dimension across the flange being greater than a corresponding dimension across the connector receiving opening;

a sleeve section projecting axially from the flange to be received within the connector receiving opening;

a gasket abutment surface on the rim;

wherein the axial dimension of the annular rim from the flange to the annular gasket abutment surface is less than the axial dimension of the plate between the top and the bottom surfaces thereof;

a resilient gasket sleeve including a top end, a bottom end, a bore defined by an internal wall having a pipe gripping surface thereon shaped to be received through the connector receiving opening and over the external diameter of the pipe;

the resilient gasket sleeve also having an external plate gripping surface thereon to be slidably received through the connector receiving opening;

the plate gripping surface of the resilient gasket sleeve including a first axial section downwardly adjacent the top sleeve end to axially overlap a portion of the wall of the connector receiving opening; and a second axial section downwardly adjacent the first axial section to project axially downward of the bottom plate surface;

the first axial section being expandable radially outward to seal against the portion of the wall of the connector receiving opening and the second section being expandable against the bottom surface of the plate;

operator means for selectively drawing the gasket sleeve toward the annular rim; and means for radially deforming the resilient gasket sleeve responsive to the operator means such that the pipe gripping surface is compressed about the pipe coaxially therewith and such that the plate gripping surface is expanded and sealed against the plate in a substantially coaxial relationship with the connector receiving opening axis.

* * * * *